US008666888B2

(12) United States Patent
Edmonds et al.

(10) Patent No.: US 8,666,888 B2
(45) Date of Patent: *Mar. 4, 2014

(54) SAME-DAY SETTLEMENT OF FINANCIAL TRANSACTIONS

(71) Applicant: Capital One Financial Corporation, McLean, VA (US)

(72) Inventors: David Scott Edmonds, Glen Allen, VA (US); Stephen Ray Winston, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,880

(22) Filed: Jan. 28, 2013

(65) Prior Publication Data

US 2013/0144780 A1 Jun. 6, 2013

Related U.S. Application Data

(63) Continuation of application No. 11/555,421, filed on Nov. 1, 2006, now Pat. No. 8,364,585.

(51) Int. Cl.
*G06Q 40/00* (2012.01)
(52) U.S. Cl.
USPC .......................................... 705/39
(58) Field of Classification Search
USPC .......................................... 705/39
See application file for complete search history.

(56) References Cited

U.S. PATENT DOCUMENTS

2004/0236692 A1* 11/2004 Sellen et al. .................... 705/45
2005/0097050 A1* 5/2005 Orcutt ............................ 705/45

* cited by examiner

*Primary Examiner* — Clifford Madamba
(74) *Attorney, Agent, or Firm* — Hunton & Williams LLP

(57) ABSTRACT

A system and method to receive a financial transaction and transfer funds associated with the financial transaction into an account associated with an originator of the financial transaction to settle the financial transaction on the same day that the financial transaction is originated. The financial transaction may be one of a plurality of financial transactions and the financial transaction is identified as being eligible for same-day settlement using routing or transit numbers associated with an entity that receives the financial transaction.

24 Claims, 6 Drawing Sheets

SAME-DAY SETTLEMENT OF FINANCIAL TRANSACTIONS

CROSS-REFERENCE OF RELATED APPLICATIONS

The present application is a continuation application of U.S. patent application Ser. No. 11/555,421, filed Nov. 1, 2006, the contents of which is incorporated herein by reference in its entirety.

BACKGROUND OF THE INVENTION

Automated clearinghouse (ACH) transactions provide a low-cost ways for settling financial transactions. However, ACH and other conventional low-cost ways for collecting payment funds require at least one day to settle the financial transaction, resulting in at least one day of deposit float for each transaction.

This and other drawbacks exist with current systems.

SUMMARY OF THE INVENTION

Various exemplary embodiments provide a method to receive a financial transaction and transfer funds associated with the financial transaction into an account associated with an originator of the financial transaction to settle the financial transaction on the same day that the financial transaction is originated. The financial transaction may be one of a plurality of financial transactions and the financial transaction is identified as being eligible for same-day settlement using routing or transit numbers associated with an entity that receives the financial transaction.

Various exemplary embodiments also provide a method including receiving information about a plurality of financial transactions, processing the information to determine whether at least one of the plurality of financial transactions is eligible for same-day settlement, and transmitting information about a financial transaction that is eligible for same-day settlement to a relationship bank based on a determination that at least one of the plurality of financial transactions is eligible for same-day settlement. To settle a financial transaction that is eligible for same-day settlement, the relationship bank electronically transfers funds associated with the financial transaction that is eligible for same-day settlement into an account associated with an originator of the financial transaction that is eligible for same-day settlement.

Various exemplary embodiments also provide a system including a processor to receive information about a plurality of financial transactions and a sorting mechanism to determine whether at least one of the plurality of financial transactions is eligible for same-day settlement and transmit information about a financial transaction that is eligible for same-day settlement to a relationship bank based on a determination that at least one of the plurality of financial transactions is eligible for same-day settlement. To settle a financial transaction that is eligible for same-day settlement, the relationship bank electronically transfers funds associated with the financial transaction that is eligible for same-day settlement into an account associated with an originator of the financial transaction that is eligible for same-day settlement.

Various exemplary embodiment may also provide a method including receiving a plurality of payment instructions, combining the plurality of payment instructions into a financial transaction file, and transmitting the financial transaction file to a processor for same-day settlement. Each of the plurality of payment instructions may include an amount and a routing or transit number associated with an account for redeeming payment. The processor may compare the routing or transit numbers associated with each of the plurality of payment instructions in the financial transactions file with routing or transit numbers associated with relationship banks to determine whether at least one of the plurality of payment instructions is eligible for same-day settlement. Also, to settle a payment instruction that is eligible for same-day settlement, the relationship bank electronically transfers the amount associated with the respective payment instruction that is eligible for same-day settlement into an account associated with the recipient of the payment instruction that is eligible for same-day settlement.

Various exemplary embodiments may provide a computer-accessible medium encoded with computer program code. In these embodiments the program code may be effective to receive a financial transaction and transfer funds associated with the financial transaction into an account associated with an originator of the financial transaction to settle the financial transaction on the same day that the financial transaction is originated. The financial transaction may be one of a plurality of financial transactions and the financial transaction is identified as being eligible for same-day settlement using routing or transit numbers associated with an entity that receives the financial transaction.

Various exemplary embodiments may provide a computer-accessible medium encoded with computer program code. In these embodiments the program code may be effective to receive information about a plurality of financial transactions, process the information to determine whether at least one of the plurality of financial transactions is eligible for same-day settlement, and transmit information about a financial transaction that is eligible for same-day settlement to a relationship bank based on a determination that at least one of the plurality of financial transactions is eligible for same-day settlement. To settle a financial transaction that is eligible for same-day settlement, the relationship bank electronically transfers funds associated with the financial transaction that is eligible for same-day settlement into an account associated with an originator of the financial transaction that is eligible for same-day settlement.

Various exemplary embodiments may provide a computer-accessible medium encoded with computer program code. In these embodiments the program code may be effective to receive a plurality of payment instructions, combine the plurality of payment instructions into a financial transaction file, and transmit the financial transaction file to a processor for same-day settlement. Each of the plurality of payment instructions may include an amount and a routing or transit number associated with an account for redeeming payment. The processor may compare the routing or transit numbers associated with each of the plurality of payment instructions in the financial transactions file with routing or transit numbers associated with relationship banks to determine whether at least one of the plurality of payment instructions is eligible for same-day settlement. To settle a payment instruction that is eligible for same-day settlement, the relationship bank electronically transfers the amount associated with the respective payment instruction that is eligible for same-day settlement into an account associated with the recipient of the payment instruction that is eligible for same-day settlement.

Various exemplary embodiments may also provide a method including receiving a financial transaction and transferring funds associated with the financial transaction into an account associated with an originator of the financial transaction to settle the financial transaction on the same day that the financial transaction is originated. In these embodiments, the financial transaction may be one of a plurality of financial transactions and the financial transaction may be identified as being eligible for same-day settlement using an indicator associated with the financial transaction.

Other embodiments may be considered.

DETAILED DESCRIPTION OF EXEMPLARY EMBODIMENT(S)

Figure 1:
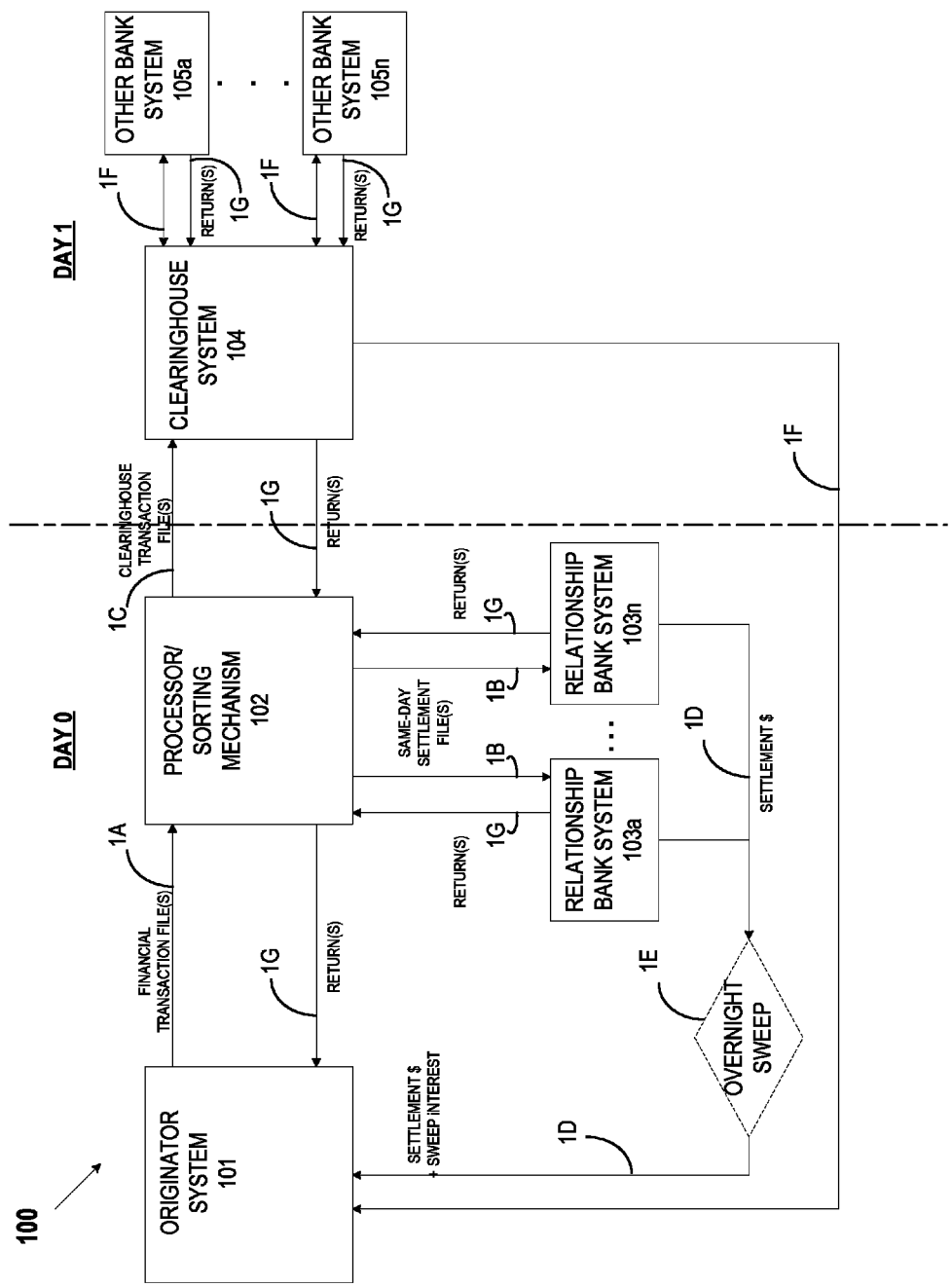
FIG. 1 depicts a schematic of a system and flow of data for processing financial transactions according to various embodiments of the disclosure.

Exemplary embodiments are discussed in detail below. While specific exemplary embodiments are discussed, it should be understood that this is done for illustration purposes only. A person skilled in the relevant art will recognize that other components and configuration can be used without departing from the spirit and scope of the claimed inventions.

Various exemplary embodiments provide for the same-day settlement of financial transactions. In these embodiments, same-day settlement of a financial transaction may refer to a financial transaction that settles on the same day that the financial transaction is originated. For example, referring to FIGS. 1 and 2, if a financial transaction is originated on Day 0, the financial transaction settles on Day 0, thus making the funds available to the recipient on Day 0. A financial transaction may be originated, for example, when an entity first requests that the funds be transferred.

In various exemplary embodiments, to achieve and benefit from same-day settlement of financial transactions, an originator of the financial transaction may establish relationships with one or more relationship banks. In these embodiments, the originator may, for example, own a demand deposit account at each of the respective one or more relationship banks. Also, the terms of the same-day settlement of financial transactions may be negotiated and defined in an agreement between the originator and the respective one or more relationship banks. For example, the originator and relationship banks may agree to a deadline time for sending/receiving financial transactions that are to be settled on the same day. Also, the originator and relationship banks may agree to a benefit-sharing model as will be described in greater detail below. According to various benefit sharing models, the originator may pay the relationship in exchange for settling the financial transaction on the same day it was received.

Same-day settlement of financial transactions may reduce float associated with the transactions. Float may be referred to as the delay time between when payments or deposits are received and when those funds are actually available to the recipient. In various exemplary embodiments, financial transactions may include, for example, credit and/or debit transactions, cash consolidation transactions, and the like. For example, a customer may pay a bill online at a biller's website, causing the biller to originate a debit transaction against the customer's bank account. Similarly, a customer may pay a bill online using the customer's online banking services, causing the customer's bank to originate a credit transaction to the biller. In other examples, a company may originate debit transactions against the company's local bank accounts to consolidate money into one central bank account. Other transactions may also be considered in which same-day settlement of financial transactions may occur.

As interest rates, such as the Federal Funds Rate, increase, deposit float may also increase. Deposit float may refer to, for example, the opportunity cost associated with not possessing the funds. When interest rates increase, billing companies such as service providers (e.g., utility companies and the like), financial institutions, and the like may be motivated to reduce deposit float and the related opportunity costs of not having immediate access to funds in the collection process.

Automated Clearinghouse (ACH) and other electronic channels may provide a way to collect payment funds and/or processing other like financial transactions. Conventional ACH transactions require at least one entire day to settle, meaning that the financial institution originating an ACH debit or receiving an ACH credit will not be able to receive funds available for use at least until the following business day. Under this model, for example, ACH float cannot be less than one business day, and the cost of that float in a high interest rate environment may be substantial.

Homebanking and other online bill payment services may provide conventional channels for processing financial transactions. Recent improvements in efficiency within the payment industry, for example, have caused consumers to expect that those gains will be passed on to the consumers through faster and more convenient methods for processing financial transactions. However, to date, these conventional channels for processing financial transactions do not provide for same-day settlement or immediate posting of payment. Instead, most consumers will experience at least a one to four day delay before the transaction is processed. Such a delay, for example, may be problematic for a consumer facing an impending due date that requires processing before the at least one to four day delay. Thus, consumers may benefit from a system and method for processing financial transactions on the same day that the financial transaction is originated.

FIG. 1 depicts an exemplary embodiment of a system 100 for same-day settlement of financial transactions. System 100 may include, for example, an originator system 101, a processor/sorting mechanism 102, one or more relationship bank systems 103a-103n, a clearinghouse system 104, and one or more other bank systems 105a-105n. The components depicted in FIG. 1 may be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In exemplary embodiments, the network may include one, or any number of the exemplary types of networks mentioned above operating as a stand alone network or in cooperation with each other. Use of the term network herein is not intended to limit the network to a single network.

Originator system 101 may be associated with an originator of the financial transaction. Exemplary originators may include without limitation: a financial institution (e.g., a bank), a customer, a biller, an online bill paying customer, an online bill paying entity, an employer, an employee, a company, or other like entity for originating a financial transaction. Originator system 101 may include one or more network-enabled computers to process instructions for originating a financial transaction as will be described in greater detail below. As referred to herein, a network-enabled computer may include, but is not limited to: e.g., any computer device, or communications device including, e.g., a personal computer (PC), a workstation, a mobile device, a phone, a handheld PC, a personal digital assistant (PDA), a thin client, a fat client, an network appliance, an Internet browser, a server, or other device.

The one or more network-enabled computers of originator system 101 may execute one or more software applications to, for example, receive information about financial transactions, compile the information, format the information into a file, e.g., a batch file, and transmit the information to a processor/sorting mechanism. The one or more network-enabled computers may also include one or more software applications to, for example, enable and/or control the same-day settlement of financial transactions.

Relationship bank systems 103a-103n may be associated with one or more respective relationship banks. In the example illustrated in FIG. 1, the originator associated with originator system 101 and the relationship banks associated with the respective one or more relationship bank systems 103a-103n may have a predefined relationship for enabling same-day settlement of financial transactions. Also the one or more relationship bank systems 103a-103n may be capable of receiving and processing same-day settlement financial transactions.

Relationship bank systems 103a-103n may include one or more network-enabled computers to process instructions for same-day settlement of a financial transaction as will be described in greater detail below. The one or more network-enabled computers of relationship bank systems 103a-103n may execute one or more software applications to, for example, receive information about financial transactions and process the financial transactions.

Other bank systems 105a-105n may be associated with one or more respective other banks. In the example illustrated in FIG. 1, the originator associated with originator system 101 and the other banks associated with the one or more other bank systems 105a-105n may not have a predefined relationship for enabling same-day settlement of financial transactions. Also, the one or more other bank systems 105a-105n may not be capable of receiving or processing same-day settlement financial transactions.

Other bank systems 105a-105n may include one or more network-enabled computers to process instructions for settling a financial transaction via, for example, a clearinghouse system as described in greater detail below. The one or more network-enabled computers of other bank systems 105a-105n may execute one or more software applications to, for example, receive information about financial transactions and process the financial transactions.

Clearinghouse system 104 may be associated with a clearinghouse entity. In various exemplary embodiments, a clearinghouse entity may include without limitation: an ACH clearinghouse (e.g., the Electronic Payments Network and/or the Federal Reserve Bank clearinghouse) and/or any other like entity capable of serving as a clearinghouse for financial transactions (e.g., a proprietary clearinghouse). In such embodiments, the other banks associated with other bank systems 105a-105n may each hold a financial account with the clearinghouse entity, for example, to enable settlement of financial transactions.

In various exemplary embodiments, originator system 101 may originate a financial transaction. For example, upon receiving instructions from an originator (electronically or otherwise), originator system 101 may originate a debit transaction and/or a credit transaction. When originating a debit transaction, originator system 101 may, for example, provide payment instructions to debit a deposit account associated with one of the relationship bank systems 103a-103n or one of the other bank systems 105a-105n. When originating a credit transaction, originator system 101 may, for example, provide payment instructions to credit a deposit account associated with one of the relationship bank systems 103a-103n or one of the other bank systems 105a-105n. In one example, originator system 101 may originate financial transactions as a batch-processed, value-dated electronic funds transfer between originator system 101 and one of the receiving systems (e.g., one of the relationship bank systems 103a-103n or one of the other bank systems 105a-105n).

To originate financial transactions according to various exemplary embodiments, originator system 101 may transmit one or more financial transaction file(s) (1A) to processor/sorting mechanism 102. The one or more financial transaction file(s) may include, for example, an ACH file, e.g., an ACH batch file and/or any other like file for processing an electronic funds transfer between originator system 101 and the receiving system (e.g., a proprietary file format). The one or more financial transaction file(s) may include, for example, routing and transit numbers associated with the receiving systems, account information associated with the account to be debited and/or credited for each transaction, payment information including accounts receivable or invoice record data, addenda records (e.g., purchase order information), and/or any other information to enable same-day settlement and/or same-day commerce. Also, the one or more financial transaction file(s) may include information associated with one or more financial transaction(s). For example, financial transaction file(s) may include information associated with one, some, or all of the credit and/or debit files to be originated by originator system 101 for a given period of time (e.g., all files on Day 0, files before 12:00 p.m. on Day 0, files after 12:00 p.m., but before 9:00 p.m. on Day 0, or all files to Bank XYZ on Day 0).

Where financial transactions are directed to one of the relationship bank systems 103a-103n, the originator associated with the originator system 101 and relationship bank associated with the respective relationship bank systems 103a-103n may agree as to a time during Day 0 (e.g., 8:30 or 9:00 p.m.) by which financial transaction file(s) are to be transmitted and/or received to enable same-day processing. The one or more financial transaction file(s) may then be transmitted and/or received in time for the relationship bank systems 103a-103n to run a daily posting process that applies debit and/or credit transactions against demand deposit accounts.

Upon receipt of financial transaction file(s), processor/sorting mechanism 102 may process and sort the financial transaction file to determine, for example, which financial transactions among the financial transactions identified in the financial transaction file(s) are eligible for same-day processing. As noted above, financial transaction file(s) may include routing and transit numbers associated with each transaction in the financial transaction file. Using, for example, the routing and transit numbers, processor/sorting mechanism 102 may sort the financial transaction files to identify which financial transactions are to be processed on the same day (e.g., Day 0) by the one or more relationship bank systems 103a-103n. Also, the financial transactions may include an indicator to indicate that a financial transaction is eligible for same-day settlement. Where, for example the financial transaction includes this indicator, processor/sorting mechanism 102 may scan the financial transactions for the presence of this indicator to identify which financial transactions are to be processed on the same day (e.g., Day 0) by the one or more relationship bank systems 103a-103n.

Those financial transactions that are to be processed on the same day (e.g., Day 0) by the one or more relationship bank systems 103a-103n may be compiled by processor/sorting mechanism 102 into one or more same-day settlement file(s). Those financial transactions that are not to be processed on the same day by the one or more relationship bank systems 103a-103n may be compiled by processor/sorting mechanism 102 into one or more clearinghouse transaction file(s).

Processor/sorting mechanism 102 may also transmit same-day settlement file(s) (1B) to the one or more relationship bank systems 103a-103n and clearinghouse transaction file(s) (1C) to clearinghouse system 104. In various exemplary embodiments, processor/sorting mechanism 102 may transmit the same-day settlement file(s) (1B) and the clearinghouse transaction file(s) (1C) to the appropriate recipient using, for example, the routing and transit numbers of the financial transactions associated with the same-day settlement file(s) and the clearinghouse transaction file(s).

Originator system 101 and/or processor/sorting mechanism 102 may be capable of controlling the same-day processing of financial transactions. For example, when transmitting a financial transaction file (1A), originator 101 may instruct processor/sorting mechanism 102 to transmit all financial transactions (1C) directly to clearinghouse system 104, regardless of whether the financial transactions within the financial transaction file(s) may be eligible for same-day settlement. This instruction may occur when, for example, transmission of the financial transaction file occurs after the agreed-upon time during Day 0 for transmitting financial transaction files for same-day settlement. Also, processor/sorting mechanism 102 may include instructions to override or stop the sorting process. When such an override or stoppage of the sorting process occurs, the processor/sorting mechanism 102 may transmit all financial transaction files directly to clearinghouse system 104. The ability to control the same-day processing of financial transactions may, for example, allow originator system 101 and/or processor/sorting mechanism 102 to start and stop the same-day processing of financial transactions depending on, for example, the time of day and/or day of the week, or other factors.

As shown in FIG. 1, processor/sorting mechanism 102 may be separate from originator system 101. In such an embodiment, the processor/sorting mechanism 102 may serve as a third-party processor of the financial transaction. For example, if the originator associated with originator system 101 selects, the originator may outsource the processing and sorting of the originator's financial transactions to a third-party processing/sorting entity associated with processor/sorting mechanism 102 or otherwise establish those operations as separate operations. Processor/sorting mechanism 102 may therefore include one or more network-enabled computer(s) to receive financial transaction files, process and sort the financial transaction files, and transmit the sorted files to the appropriate systems (e.g., relationship bank systems 103a-103n and/or a clearinghouse system 104).

The operations performed by processor/sorting mechanism may be distributed between and among the one or more network-enabled computers. For example, a first network-enabled computer may include a module to receive financial transaction files, a second network-enabled computer may include a module to process and sort the financial transaction files, and a third network-enabled computer may include a module to transmit the sorted files to the appropriate systems. Also, a first network-enabled computer may include a module to perform a combination of the operations of processor/sorting mechanism 102 and a second network-enabled computer may include a module to perform the remaining operations of processor/sorting mechanism 102, for example.

The operations performed by processor/sorting mechanism may also be distributed between and among a plurality of modules within a single-network enabled computer. For example, a single network-enabled computer may include a receiving module to receive financial transaction files, a processing module to process the financial transaction files, a sorting module to sort the financial transaction files, and a transmitting module to transmit the sorted files to the appropriate systems.

Where, for example, incoming financial transaction files (1A) vary in format from either outgoing clearinghouse transaction files or same-day settlement files, processor/sorting mechanism 102 may also include convert the incoming file formats into different file formats. For example, where incoming financial transaction files may be formatted using an originator system specific file format, processor/sorting mechanism 102 may include convert the originator system specific file format into a file format that is acceptable for ACH transactions. Similarly, where incoming financial transaction files may be formatted using ACH file formats, processor/sorting mechanism 102 may convert ACH file format into a relationship-bank-system-specific file format for transmitting same-day settlement files.

Upon receipt of same-day settlement file(s), relationship bank systems 103a-103n may process the financial transactions identified in the same-day settlement file(s) on the same day that the financial transaction was originated (e.g., Day 0). To process a financial transaction on the same day the financial transaction was originated, relationship bank systems 103a-103n may, for example, electronically transfer funds into a demand deposit account (1D) owned by the originator associated with the originator system 101 at one of the relationship banks associated with the respective relationship bank systems 103a-103n. For example, a biller (ABC Corp.) may have a demand deposit account at one of the biller's customer's banks (e.g., Bank XYZ). When the customer instructs the ABC Corp (originator) to debit an amount from the customer's account at Bank XYZ (relationship bank), to process that transaction on the same day, Bank XYZ may electronically transfer (1D) the amount from customer's demand deposit account at Bank XYZ into ABC Corp's demand deposit account at Bank XYZ, as described in greater detail below with respect to FIG. 4. Also, when using, for example, an electronic bill pay service provided by Bank XYZ, the customer may instruct Bank to pay ABC Corp. an amount. In this example, to process the transaction on the same day, Bank XYZ may electronically credit an amount from the customer's demand deposit account at Bank XYZ into ABC Corp's demand deposit account at Bank XYZ, as described in greater detail below with respect to FIG. 5.

By electronically transferring funds into a demand deposit account associated with originator system 101 on the same day, the originator associated with originator system 101 may reduce or eliminate the float associated with processing the financial transaction. Doing so may avail the originator of the funds associated with the financial transaction on the same day that the financial transaction was originated. With access to the funds, the originator system 101 may, for example, then post the transaction. The originator may also benefit from accessing the funds by optionally instructing the relationship bank system, for example, to optionally sweep (1E) the funds into an overnight investment account.

By optionally sweeping the funds (1E) into an overnight account, the originator associated with originator system 101 and/or the originator may receive the benefit of possessing the funds in an overnight account. For example, if the Federal Funds Rate or some other interest rate associated with the overnight sweep account is five percent on the night that the overnight sweep occurs, the originator associated with originator system 101 and/or originator system 101 may receive one day's worth of the five percent interest on the funds that the originator system 101 possesses as a result of the same-day transaction settlement. The originator may also receive periodic value benefits to offset fees with a monthly earnings credit, for example.

In various exemplary embodiments, to process a financial transaction on the same day the financial transaction was originated, relationship bank systems 103a-103n may also, for example, wire transfer the funds or engage a clearinghouse to net the transaction for settlement on the same day that the transaction was originated.

In exchange for receiving this benefit of same-day settlement, under, for example, a sharing model, originator system 101 may provide the relationship bank system 105a-105n that processed the transaction with an explicit per-item fee revenue. As will be discussed in greater detail below, the originator associated with originator system 101 and the relationship bank associated with the respective one or more relationship bank systems 105a-105n may establish any number of predefined revenue sharing models.

As noted above, financial transactions file(s) that are not eligible for same-day settlement may be compiled by processor/sorting mechanism 102 into clearinghouse transaction file(s) and transmitted (1C) to clearinghouse system 104 for processing. Clearinghouse system 104 may function in a manner similar to that of a conventional clearinghouse such as, e.g., the Electronic Payments Network and/or the Federal Reserve Bank clearinghouse. In these embodiments, the financial transactions associated with the clearinghouse file(s) may settle (1F) at least one day after the financial transaction is originated (e.g., Day 1). Moreover, both of the originator associated with originator system 101 and the other bank associated with the respective one or more other bank systems 105a-105n may be required to pay a per transaction fee to a clearinghouse associated with clearinghouse system 104.

As illustrated in FIG. 1, system 100 may enable returns and adjustments (1G) between the components of the system.

Figure 2:
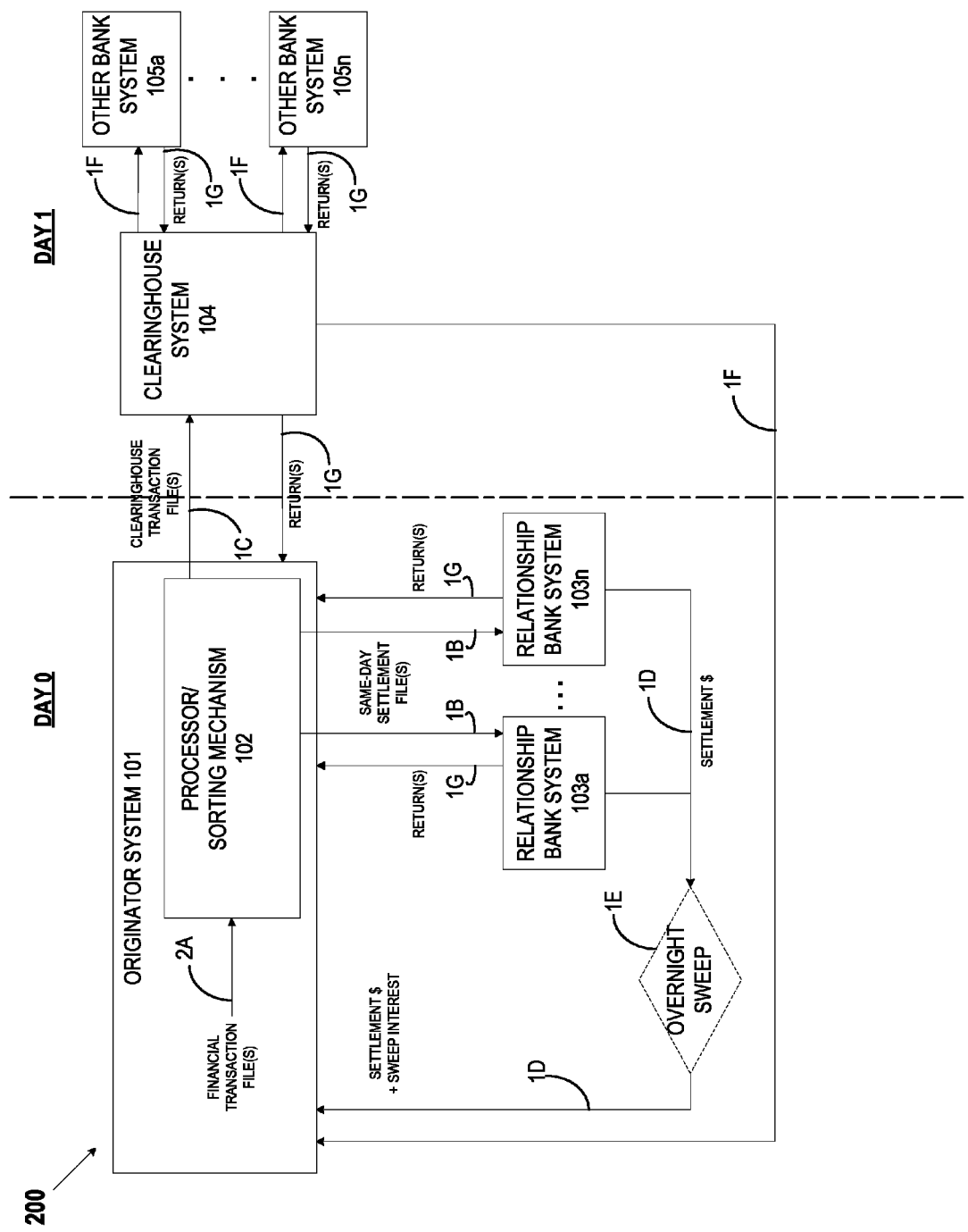
FIG. 2 depicts a schematic of a system and flow of data for processing financial transactions according to various embodiments of the disclosure.

FIG. 2 depicts another exemplary embodiment of a system 200 for same-day settlement of financial transactions. System 200 may include, for example, an originator system 101, a processor/sorting mechanism 102, one or more relationship bank systems 103a-103n, a clearinghouse system 104, and one or more other bank systems 105a-105n. The components of FIG. 2 being represented by the same reference numbers as components depicted in FIG. 1 illustrate identical, functionally similar, and/or structurally similar components as described above with respect to FIG. 1.

As shown in FIG. 2, in various exemplary embodiments, processor/sorting mechanism 102 may be a component of originator system 101. In these embodiments, processor/sorting mechanism 102 may include one or more modules executing on a computing device within originator system. For example, as noted above, originator system may include one or more network-enabled computers. The one or more network-enabled computers may execute one or more modules to, for example, receive information about financial transactions, compile the information, format the information into a file, e.g., a batch file, and sort the information into financial transactions that are eligible for same-day settlement and financial transactions that are not eligible for same-settlements. The one or more network-enabled computers may also include one or more modules to, for example, enable and/or control the same-day settlement of financial transactions as described above.

As shown in FIG. 2, financial transaction file(s) may be input (2A) into processor/sorting mechanism 102 from within originator system 101. In these embodiments, originator system 101, in combination with processor/sorting mechanism 102, may process and sort the financial transaction files to determine which financial transactions are eligible for either same-day settlement or settlement via a clearinghouse and properly format the outgoing respective same-day settlement file(s) and clearinghouse transaction file(s). The combination of originator system 101 and processor/sorting mechanism 102 may include one or more network-enabled computers to originate financial transactions and process and sort the financial transaction as described with respect to FIG. 1.

Figure 3:
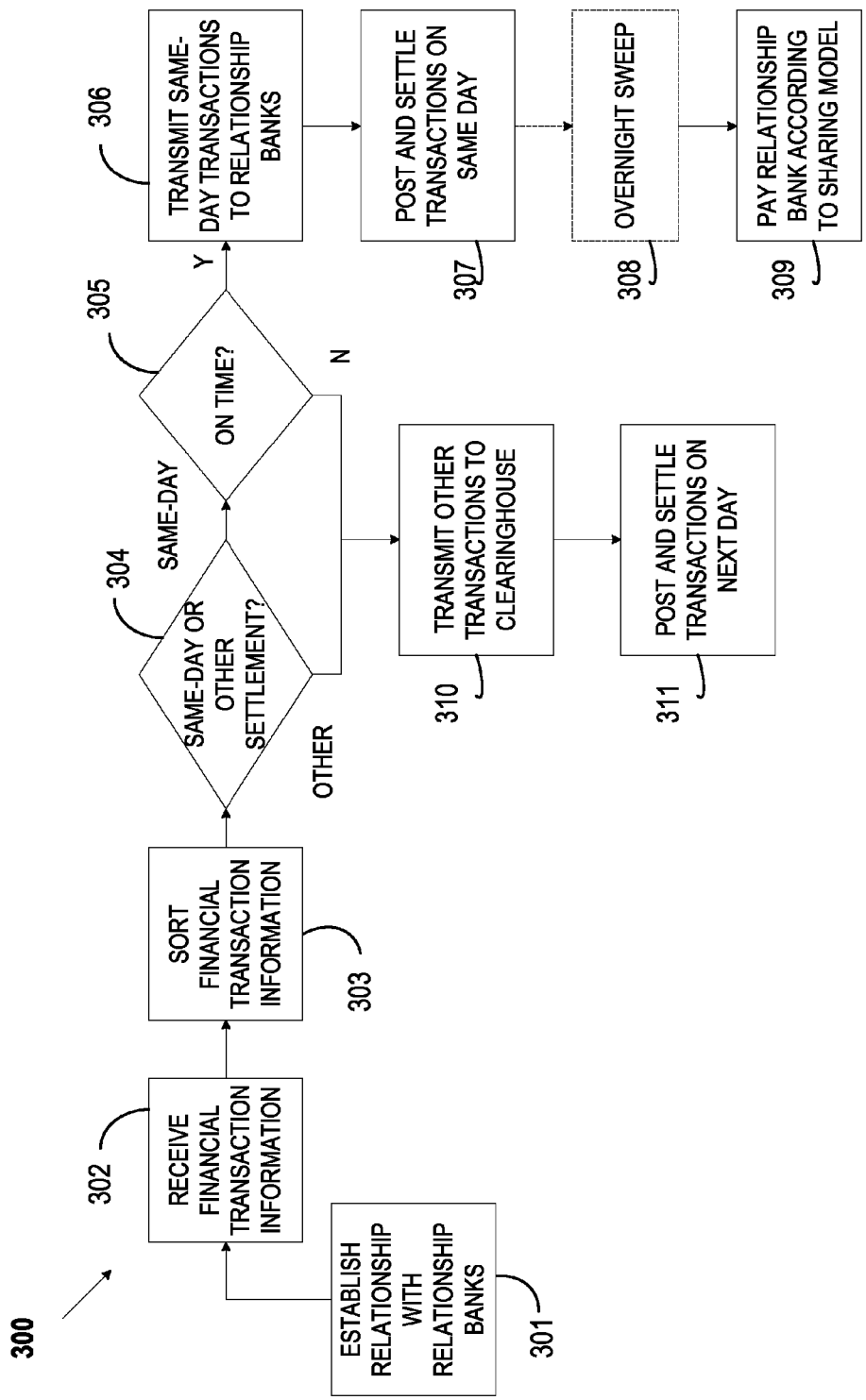
FIG. 3 depicts an exemplary method for processing financial transactions according to various embodiments of the disclosure.

FIG. 3 depicts an exemplary flow chart 300 which illustrates an exemplary method for same-day settlement of financial transactions.

In block 301, relationships may be established with relationship banks. In various exemplary embodiments, an originator (of a financial transaction) may be associated with an originator system and a receiving bank (of the financial transaction) may be associated with a relationship bank system or an other bank system, for example. Also, an originator may have a relationship with the relationship banks to provide same-day settlement of financial transactions.

To establish a relationship, the originator and relationship banks may establish parameters for the same-day settlement or financial transactions. For example, the relationship banks may identify eligible routing and transit numbers associated with relationship banks that are capable of settling financial transactions on the same day that the transaction is originated. The originator and the relationship bank may establish a mechanism for communicating data associated with the same-day settlement of financial transactions. For example, the originator and relationship bank may communicate via network-enabled computers that transmit conventional encrypted ACH batch files. Also, the originator and relationship bank may communicate via network-enabled computers that transmit one or more files, e.g., batch files according to a specification that may be defined by the originator for the relationship banks. This specification may define, for example, the data that may be included in the file (e.g., transaction and routing numbers and/or any other data about the originator, relationship banks and/or financial transaction), the type of encryption for the data and/or files (e.g., public or private encryption), and/or any other information that enables same-day settlement of financial transactions between the originator and the relationship banks.

The originator and the relationship bank may also establish deadlines for transmitting and/or receiving financial transaction information such that those financial transactions received before the deadline will settle on the same day the transactions originate. For example, the originator and the relationship bank may establish that all financial transactions transmitted by the originator before 8 p.m. are eligible for same-day settlement. Also, the originator and the relationship bank may establish that all financial transactions that are received by the relationship bank before 9 p.m. are eligible for same-day settlement and that all financial transactions received by the relationship bank after 9 p.m. will be settled on, for example, the following day.

The originator may also establish a demand deposit account at the relationship bank to, for example, receive the funds associated with financial transactions.

The originator and the relationship bank may also establish a sharing model for sharing the benefits associated with the same-day settlement of financial transactions as described in greater detail below.

In block 302, financial transaction information may be received by a processor and/or sorting mechanism. An originator system may receive information about one or more financial transactions to be processed between an originator system and a receiving bank. For example, an originator system may receive information about a debit, credit, cash consolidation, and/or like financial transaction. This information may include data about individual financial transactions that may be compiled into, for example, one or more batch files (e.g., an ACH batch file and/or any other like file) for processing an electronic funds transfer.

The one or more files may then be processed and/or sorted. For example, the one or more files may be transmitted in a secure and/or encrypted manner for processing and sorting.

In block 303, financial transaction information may be sorted, for example, by a processor and/or sorting mechanism. As noted above, those relationship banks that may settle financial transactions on the same day may identify themselves by routing and transit number. Using, for example, the routing and transit numbers contained in financial transaction files, a determination may be made as to which financial transactions are eligible for same-day settlement and which financial transactions are not eligible for same-day settlement. For example, a comparison may be made between routing and transit numbers associated with the financial transactions and routing and transit number that have been identified by relationship banks to determine whether a financial transaction is eligible for same-day settlement. If for example, the routing and transit number associated with the financial transaction match routing and transit numbers identified by the relationship bank, the financial transaction may be eligible for same-day settlement.

If, in block 304 it is determined that a financial transaction is eligible for same-day settlement, in block 305 a determination may be made as to whether the financial transaction has been transmitted and/or received on time. As noted above, a originator and relationship bank may establish deadlines for transmitting and/or receiving financial transactions for same-day settlement. If it is determined that a financial transaction is eligible for same-day settlement and the financial transaction has been transmitted and/or received on time, the transactions eligible for same-day settlement may be transmitted to the relationship banks in block 306. The transactions eligible for same-day settlement may be transmitted to the relationship banks using, for example, the routing and transit numbers associated with the relationship banks. If it is determined that a financial transaction is not eligible for same-day settlement and/or the financial transaction has not been transmitted and/or received on time, the transactions that are not eligible for same-day settlement may be transmitted to the a clearinghouse, for example, in block 310.

In block 307, upon receiving a transaction that is eligible for same-day settlement, a relationship bank may post and settle the transaction on the same day that the transaction was originated. To post and settle the transaction on the same day that the transaction was originated, the relationship bank may post the transaction against an account at the relationship bank from which the funds are being drawn and electronically transfer the funds into the demand deposit account owned by the originator at the relationship bank.

Because the funds may be transferred into a demand deposit account owned by the originator at the relationship bank on the same day that the financial transaction was originated, the originator may benefit from possessing the funds on the same day. To benefit from possessing the funds on the same day, in block 308, the funds may optionally be swept into an overnight investment account. Doing so may avail the originator of the interest accrued on the funds in the overnight investment account. In an exemplary embodiment of the invention, the funds may be returned to the originator's demand deposit account at the relationship bank the following day along with the accrued interest.

In block 309, the originator (via, for example, the originator system), may pay the relationship bank according to a sharing model. The originator may pay the relationship bank, for example, an explicit per-item fee revenue in exchange for settling the financial transaction on the same day. In these embodiments, the per-item charge may be determined as a percentage of the float value of the item. For example, the funds associated with the financial transaction may be $500, and the applicable interest rate for the overnight investment account is five percent. In establishing a relationship, the originator and the relationship bank may establish a value sharing model of, for example, forty percent. Because settling the transaction on the same day as the transaction is originated may reduce float by one day, for example, the one day of float may be $0.0685 (calculated as $500×0.05/365=$0.0685) and this value may represent the total value captured by reducing the float from one day to zero days. Because the originator and relationship bank established that the receiving bank is to receive forty percent of this value through an explicit fee, the originator may pay $0.0274 per item to the relationship bank (calculated as $0.0685×0.4=$0.0274). In such an example, the sending party may receive, for example, $0.0411 as a per item benefit.

Other like sharing models may also be considered. For example, the originator may pay the relationship bank an explicit per item fee revenue as well as a percentage of the interest obtained as a result of the investment in the overnight sweep. Accordingly, the sharing model may be based on a static per item fee and/or a moving scale based on interest rates. In various exemplary embodiments, to receive payment, the relationship bank may debit the originator's demand deposit account. The relationship bank may also provide an invoice to the originator.

In block 311, transactions that are not eligible for same-day settlement may be posted and settled in a manner that is similar to clearing ACH transactions via a clearinghouse, for example.

Figure 4:
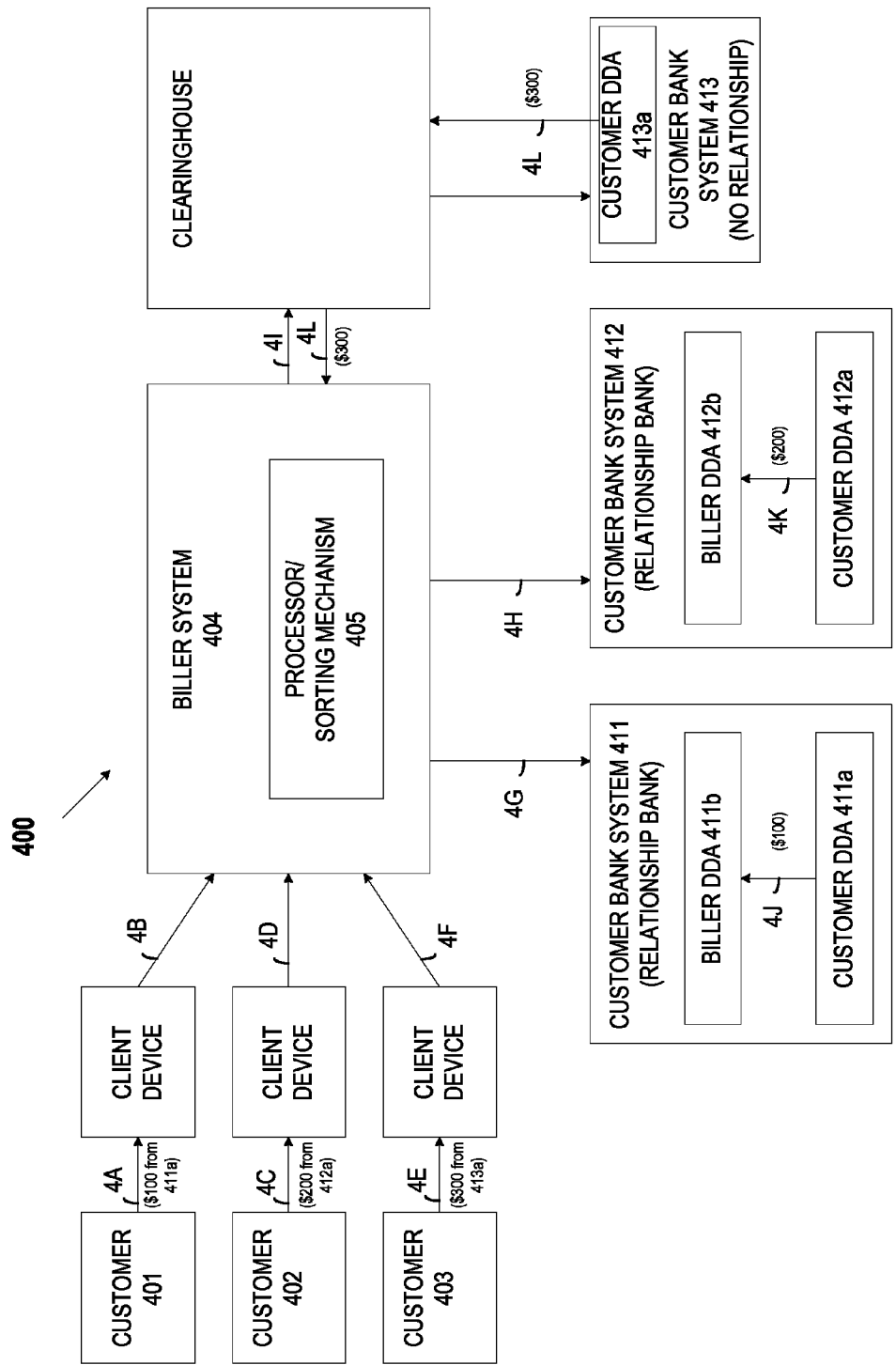
FIG. 4 depicts an exemplary system for processing financial transactions according to various embodiments of the disclosure.

FIG. 4 depicts an exemplary system 400 for the same-day settlement of a debit transaction. The components illustrated in FIG. 4 may be coupled via one or more networks as described above. In the example shown in FIG. 4, customer 401 may pay a biller associated with biller system 404 using funds located in customer demand deposit account 411a at a customer bank associated with customer bank system 411; customer 402 may pay the biller using funds located in customer demand deposit account 412a at a customer bank associated with customer bank system 412; and customer 403 may pay the biller using funds located in customer demand deposit account 413a at customer bank system 412. As illustrated in FIG. 4, customer bank system 411 and a customer bank associated with customer bank system 412 may be associated with relationship banks and customer bank 413 may not be associated with a relationship bank. The biller associated with biller system 404 may establish a relationship with the customer bank associated with customer bank system 411 and the customer bank associated with customer bank system 412 in a similar manner as described above with respect to FIG. 3. Also, the biller associated with biller system 404 may not establish a relationship with the customer bank associated with customer bank system 413 and/or customer bank may not be capable of settling financial transactions on the same day the transaction is originated.

In the example illustrated in FIG. 4, the customers 401, 402, 403 may be customers of the biller associated with biller system 404. For example, the customers 401, 402, 403 may be cardholders of a credit card company (the biller) and the credit card company may have a biller system (e.g., biller system 404) for processing bill payments. The customers 401, 402, 403 may also be recipients of a service (e.g., cable, telephone, mobile phone, power, water) from a utility company (the biller) and the utility company may have a biller system (e.g., biller system 404) for processing bill payments. The customers 401, 402, 403 may also be a debtor of a creditor (the biller) and the creditor may have a biller system (e.g., biller system 404) for processing bill payments. Other examples may be considered.

As noted above, the customers 401, 402, 403 may desire to pay a biller associated with biller system 404. Customers 401, 402, 403 may provide payment instructions via, for example, a respective client device 401a, 402a, 403a. In various exemplary embodiments, as referred to herein, a client device may include, but is not limited to: e.g., any computer device, or communications device including, e.g., a personal computer (PC), a workstation, a mobile device, a phone, a handheld PC, a personal digital assistant (PDA), a thin client, a fat client, an network appliance, an Internet browser, a paging, an alert device, a television, an interactive television, a receiver, a tuner, a high definition (HD) television, an HD receiver, a video-on-demand (VOD) system, a server, or other device.

Client devices 401a, 402a, 403a may execute an application, such as for example, a web application, that is presented to the user via a user interface on the client device. For example, using client devices 401a, 402a, 403a, customers 401, 402, 403 may access a web page hosted by biller system 404 for enabling electronic payment of bills (e.g., an electronic bill pay Website). Also, client devices 401a, 402a, 403a may execute a standalone application that may be installed on client devices 401a, 402a, 403a for enabling electronic payment of bills. For purposes of this discussion, the example illustrated in FIG. 4 will be described in the context of client devices 401a, 402a, 403a executing a web application that is presented to the customer via a user interface on the client device. Also, for purposes of this discussion, assume that customer 401 will pay biller the amount of $100; customer 402 will pay the biller the amount of $200; and customer 403 will pay biller the amount of $300.

Using the web application executing on client device 401a, for example, customer 401 may provide electronic payment instructions (4A) to client device 401a to pay the biller associated with biller system 404 the amount of $100 from customer demand deposit account 411a located in an account within customer bank system 411. The payment instructions may include, for example, information associated with customer demand deposit account 411a, routing and transit numbers associated with customer bank system 411 and/or any other information to complete the financial transaction. These instructions may be transmitted to biller system 404 over a network (4B), for example. Similarly, using the web application executing on client device 402a, for example, customer 402 may provide electronic payment instructions (4C) to client device 402a to pay the biller associated with biller system 404 the amount of $200 from customer demand deposit account 412a located in an account within customer bank system 412. The payment instructions may include, for example, information associated with customer demand deposit account 412b, routing and transit numbers associated with customer bank system 412 and/or any other information to complete the financial transaction. These instructions may be transmitted to biller system 404 over a network (4D), for example. Similarly, using the web application executing on client device 403a, for example, customer 403 may provide electronic payment instructions (4E) to client device 403a to pay the biller associated with biller system 404 the amount of $300 from customer demand deposit account 413a located in an account within customer bank system 413. The payment instructions may include, for example, information associated with customer demand deposit account 413a, routing and transit numbers associated with customer bank system 413 and/or any other information to complete the financial transaction. These instructions may be transmitted to biller system 404 over a network (4F), for example.

Biller system 404 may receive the payment instructions from the customers 401, 402, 403. In various exemplary embodiments, biller system 404 may, for example, convert the separate payment instructions into debit transactions and compile the debit transactions into a financial transaction file that contains the payment instructions associated with each debit transaction. In the example illustrated in FIG. 4, the financial transaction file may contain information about three debit transactions: a first transaction debiting $100 from customer demand deposit account 411a; a second transaction debiting $200 from customer demand deposit account 412a; and a third transaction debiting $300 from customer demand deposit account 413a.

In various exemplary embodiments, the financial transaction file may be, for example, an ACH transaction file and/or a like batch file. Biller system may then pass the financial transaction file to processor/sorting mechanism 405. Also, biller system may receive the separate payment instructions and then pass the separate payment instructions directly to processor/sorting mechanism 405.

Upon receipt of the financial transaction file, processor/sorting mechanism 405 may sort the financial transaction file. To sort the financial transaction file, processor/sorting mechanism 405 may use, for example, the routing and transit number associated with the customer bank systems 411, 412, 413 to determine which financial transaction may be eligible for same-day settlement and which financial transactions may not be eligible for same day settlement. As noted above, those financial transactions that may be eligible for same-day settlement may include those financial transactions that are associated with relationship banks.

In the example illustrated in FIG. 4, because the biller associated with biller system 404 may have a relationship with the customer bank associated with customer bank system 411 and the customer bank associated with customer bank system 412, based on routing and transit numbers previously identified by the relationship banks (e.g., customer bank system 411 and customer bank system 412), processor/sorting mechanism may determine that the first and second debit transactions in the financial transaction file may be eligible for same-day settlement. Because the biller associated with biller system 404 may not have a relationship with the customer bank associated with customer bank system 413, processor/sorting mechanism may determine that the third debit transaction in the financial transaction file may not be eligible for same-day settlement.

Biller system 404 may then originate debit transactions by transmitting the sorted files to the customer banks for settlement. For example, biller system 404 may originate a debit transaction by transmitting the first financial transaction to customer bank system 411 for same-day settlement (4G). Similarly, biller system 404 may originate a debit transaction by transmitting the second financial transaction to customer bank system 412 for same-day settlement. Biller system 404 may also originate a debit transaction by transmitting the third financial transaction to clearinghouse system 406 for settlement (4I) via a clearinghouse.

Upon receipt of the first debit transaction, customer bank system 411 may settle the debit transaction on the same day that the debit transaction was originated. To settle the first debit transaction on the same day that the first debit transaction was originated, customer bank system 411 may electronically transfer $100 from customer demand deposit account 411a into biller demand deposit account 411b (4J), for example. Similarly, upon receipt of the second debit transaction, customer bank system 412 may settle the debit transaction on the same day that the debit transaction was originated. To settle the second debit transaction on the same day that the debit transaction was originated, customer bank system 412 may electronically transfer $200 from customer demand deposit account 412a into biller demand deposit account 412b (4K), for example.

Upon receipt of the third debit transaction, clearinghouse system 406 may settle the third debit transaction at least one day after the third debit transaction was originated. In an exemplary embodiment, clearinghouse system 406 may settle the third debit transaction via, for example, a conventional clearinghouse system such as the Electronic Payments Network and/or the Federal Reserve Bank clearinghouse (4L).

Figure 5:
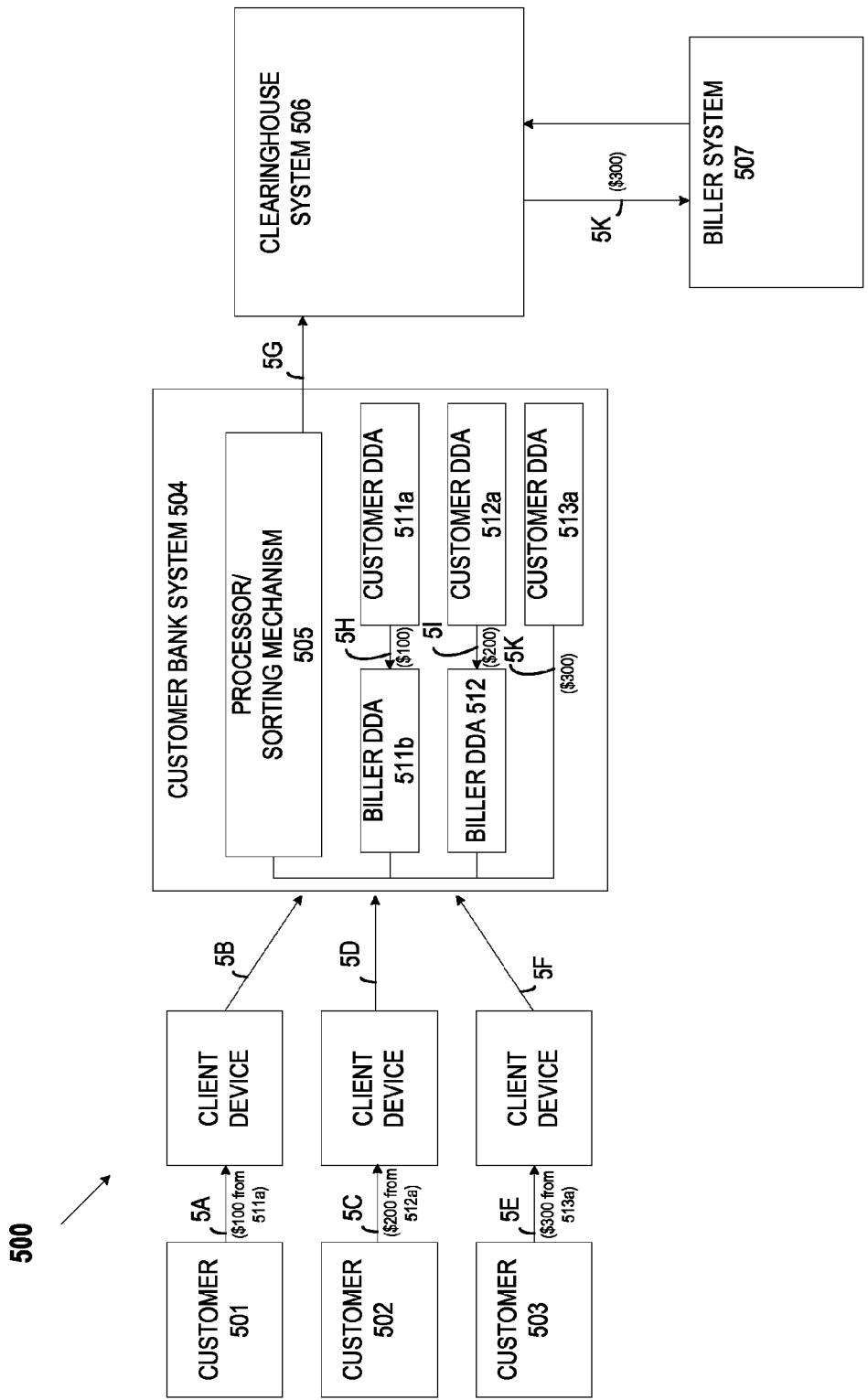
FIG. 5 depicts an exemplary system for processing financial transactions according to various embodiments of the disclosure.

FIG. 5 depicts an exemplary system 500 for the same-day settlement of a credit transaction. The components illustrated in FIG. 5 may be coupled via one or more networks as described above. In the example shown in FIG. 5, customer 501 may pay a biller associated with biller demand deposit account 511b using funds located in customer demand deposit account 511a at a customer bank associated with customer bank system 504; customer 502 may pay a biller associated with biller demand deposit account 512b using funds located in customer demand deposit account 512a at a customer bank associated with customer bank system 504; and customer 503 may pay a biller associated with biller system 507 using funds located in customer demand deposit account 513a at a customer bank associated with customer bank system 504. The customer bank associated with customer bank system 504 may have a relationship with the billers associated with biller demand deposit account 511b and biller demand deposit account 512b. The customer bank associated with customer bank system 504 may not have a relationship with the biller associated with biller system 507.

In the example illustrated in FIG. 5, the customers 501, 502, 503 may be customers of the customer bank associated with customer bank system 504. Customers 501, 502, 503 may provide payment instructions via, for example, a respective client device 501a, 502a, 503a. Client device 501a, 502a, 503a may execute, for example, an application such as a web application, that is presented to the user via a user interface on the client device. For example, using client devices 501a, 502a, 503a, customers 501, 502, 503 may access a web page hosted by customer bank system 504 for enabling electronic payment of bills (e.g., an electronic bill pay Website). Also, client devices 501a, 502a, 503a may execute a standalone application that may be installed on client devices 501a, 502a, 503a for enabling electronic payment of bills.

For purposes of this discussion, the example illustrated in FIG. 5 will be described in the context of client devices 501a, 502a, 503a executing a web application that is presented to the customer via a user interface on the client device. Also, for purposes of this discussion, assume that customer 501 will pay a biller the amount of $100; customer 502 will pay a biller the amount of $200; and customer 503 will pay a biller the amount of $300. As shown and described, FIG. 5 illustrates funds being credited from a demand deposit account. In various exemplary embodiments, funds may also be credited from, for example, any consumer and/or corporate transaction account (e.g., a credit card or other similar account). In those embodiments, transactions may be settled on the same day by electronically transferring funds from the consumer and/or corporate transaction account to a demand deposit account our another consumer and/or corporate transaction account.

Using the web application executing on client device 501a, for example, customer 501 may provide electronic payment instructions (5A) to client device 501a to pay the biller associated with biller demand deposit account 511b the amount of $100 from customer v 511a located in an account within customer bank system 504. The payment instructions may include, for example, information associated with customer demand deposit account 511a, routing and transit numbers associated with biller demand deposit account 511b and/or any other information to complete the financial transaction. These instructions may be transmitted to customer bank system 504 over a network (5B), for example. Similarly, using the web application executing on client device 502a, for example, customer 502 may provide electronic payment instructions (5C) to client device 502a to pay the biller associated with biller demand deposit account 512b the amount of $200 from customer demand deposit account 512a located in an account within customer bank system 504. The payment instructions may include, for example, information associated with customer demand deposit account 512b, routing and transit numbers biller demand deposit account 512b and/or any other information to complete the financial transaction. These instructions may be transmitted to customer bank system 504 over a network (5D), for example. Similarly, using the web application executing on client device 503a, for example, customer 503 may provide electronic payment instructions (5E) to client device 503a to pay the biller associated with biller system 507 the amount of $300 from customer demand deposit account 513a located in an account within customer bank system 504. The payment instructions may include, for example, information associated with customer demand deposit account 513a, routing and transit numbers associated with biller system 507 and/or any other information to complete the financial transaction. These instructions may be transmitted to customer bank system 504 over a network (5F), for example.

Customer bank system 504 may receive the payment instructions from the customers 501, 502, 503. In various exemplary embodiments, customer bank system 504 may, for example, convert the separate payment instructions into credit transactions and compile the credit transactions into a financial transaction file that contains the payment instructions associated with each credit transaction. In the example illustrated in FIG. 5, the financial transaction file may contain information about three credit transactions: a first transaction crediting $100 from customer demand deposit account 511a; a second transaction crediting $200 from customer demand deposit account 512a; and a third transaction crediting $300 from customer demand deposit account 513a.

In various exemplary embodiments, the financial transaction file may be, for example, an ACH transaction file and/or a like batch file. Customer bank system may then pass the financial transaction file to processor/sorting mechanism 505. Also, customer system may receive the separate payment instructions and then pass the separate payment instructions directly to processor/sorting mechanism 505.

Upon receipt of the financial transaction file, processor/sorting mechanism 505 may sort the financial transaction file. To sort the financial transaction file, processor/sorting mechanism 505 may use, for example, routing and transit numbers to determine which financial transaction may be eligible for same-day settlement and which financial transactions may not be eligible for same day settlement. As noted above, those financial transactions that may be eligible for same-day settlement may include those financial transactions that are associated with billers that have a relationship with the customer bank associated with customer bank system 504.

In the example illustrated in FIG. 5 because the biller associated with biller demand deposit account 511a and biller demand deposit account 512a may have a relationships with the customer bank associated with customer bank system, based on routing and transit numbers previously identified by the billers (e.g., the biller associated with biller demand deposit account 511a and the biller associated with 512a), processor/sorting mechanism may determine that the first and second credit transactions in the financial transaction file may be eligible for same-day settlement. Because the biller associated with biller system 507 may not have a relationship with the customer bank associated with customer bank system 504, processor/sorting mechanism may determine that the third credit transaction in the financial transaction file may not be eligible for same-day settlement.

Customer bank system 504 may then originate credit transactions. For example, biller system 504 may originate a credit transactions for the first and second credit transactions that are eligible for same-day settlement within customer bank system 504. Customer bank system 504 may also originate a credit transaction by transmitting the third financial transaction to clearinghouse system 506 for settlement (5G) via a clearinghouse.

Customer bank system 504 may settle the first and second credit transactions on the same day that the first and second credit transactions were originated. To settle the first credit transaction on the same day that the first credit transaction was originated, customer bank system 504 may electronically transfer $100 from customer demand deposit account 511a into biller demand deposit account 511b (5H), for example. Similarly, customer bank system 504 may settle the second credit transaction on the same day that the second credit transaction was originated. To settle the second credit transaction on the same day that the credit transaction was originated, customer bank system 504 may electronically transfer $200 from customer demand deposit account 512a into biller demand deposit account 512b (5I), for example.

Upon receipt of the third credit transaction, clearinghouse system 506 may settle the third debit transaction at least one day after the third credit transaction was originated. In an exemplary embodiment, clearinghouse system 506 may settle the third debit transaction via, for example, a conventional clearinghouse system such as the Electronic Payments Network and/or the Federal Reserve Bank clearinghouse (5K).

Figure 6:
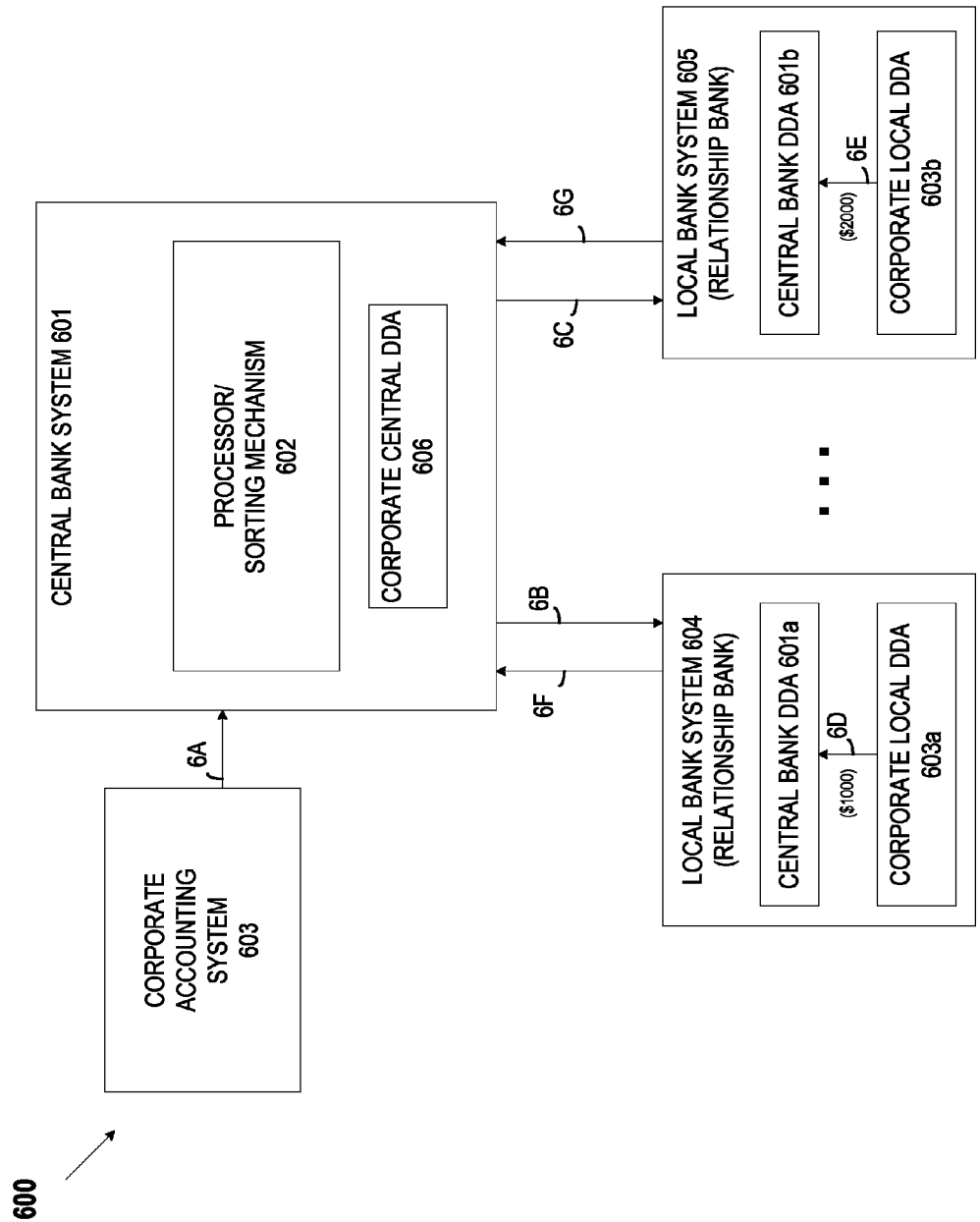
FIG. 6 depicts an exemplary system for processing financial transactions according to various embodiments of the disclosure.

FIG. 6 depicts an exemplary system 600 for the same-day settlement of cash consolidation transactions. In various exemplary embodiments, cash consolidation transactions may include one or more debit transactions which may debit funds from local banks into a central bank, for example. The components illustrated in FIG. 6 may be coupled via one or more networks as described above.

In the example illustrated in FIG. 6 an entity (e.g., a company or other entity which may have locations throughout a large geographical region) may be associated with corporate accounting system 603; a central bank may be associated with central bank system 601; a first local bank may be associated with local bank system 604; and a second local bank may be associated with local bank system 605.

The entity associated with corporate accounting system 603 may have several local offices throughout a geographical region. Each local office may be associated with a local bank. For example, a first local office of the entity may be associated with the first local bank. Similarly, a second local office of the entity may be associated with the second local bank.

Periodically (e.g., daily, weekly, monthly), the entity may desire to consolidate the cash it maintains in the entity's local bank accounts (e.g., corporate local demand deposit account 603a and 603b). To consolidate the cash, corporate accounting system may monitor the cash that is deposited into corporate local demand deposit account 603a and 603b and originate debit transactions against corporate local demand deposit account 603a and 603b to electronically transfer the funds corporate central demand deposit account 606.

To originate debit transactions against corporate local demand deposit account 603a and 603b, corporate accounting system 603 may transmit a financial transaction file (6A) to central bank system 601. In various exemplary embodiments, the financial transaction file may be, for example, an ACH transaction file and/or a like batch file. The financial transaction file may contain information about two debit transactions: a first transaction debiting $1000 from customer demand deposit account corporate local demand deposit account 603a and a second transaction debiting $2000 from corporate local demand deposit account 603b. Information about the first debit transaction may include, for example, information associated with corporate local demand deposit account 603a, routing and transit numbers associated with local bank system 604 and/or any other information to complete the financial transaction. Information about the second debit transaction may include, for example, information associated with corporate local demand deposit account 603b, routing and transit numbers associated with local bank system 605 and/or any other information to complete the financial transaction. This file may be transmitted to central bank system 601 over a network.

Upon receipt of the financial transaction file, processor/sorting mechanism 602 may sort the financial transaction file. To sort the financial transaction file, processor/sorting mechanism 602 may use, for example, the routing and transit number associated with the local bank systems 604, 605 to determine whether the financial transactions may be eligible for same-day settlement. In the example illustrated in FIG. 6, those financial transactions that may be eligible for same-day settlement may include those financial transactions that are associated with relationship banks (e.g., the local bank associated with local bank system 604 and the local bank associated with local bank system 605).

Central bank system 601 may then transmit the debit transactions to the local banks for same-day settlement. For example, central bank system 601 may transmit the first financial transaction to local bank system 604 for same-day settlement (6B). Similarly, central bank system 601 may transmit the second financial transaction to local bank system 605 for same-day settlement (6C).

Upon receipt of the first debit transaction, local bank system 604 may settle the debit transaction on the same day that the debit transaction was originated. To settle the first debit transaction on the same day that the first debit transaction was originated, local bank system 604 may electronically transfer $1000 from corporate local demand deposit account 603*a* into central bank demand deposit account 601*a* (6D), for example. Similarly, upon receipt of the second debit transaction, local bank system 605 may settle the debit transaction on the same day that the debit transaction was originated. To settle the second debit transaction on the same day that the debit transaction was originated, local bank system 605 may electronically transfer $2000 from corporate local demand deposit account 603*b* into central bank demand deposit account 601*b* (6E), for example.

Because central bank possesses the funds in central bank demand deposit account 601*a* and central bank demand deposit account 601*b*, central bank may make those funds available to the entity on the same day that the financial transactions were originated. Local bank systems 604, 605 may optionally sweep the funds in central bank demand deposit account 601*a*, 601*b*, respectively, into an overnight investment vehicle to enable the entity to benefit from interest earned in an overnight sweep account. Central bank system may ultimately retrieve the funds (with the interest or a portion of the interest earned in the overnight investment vehicle) (6F) from central bank demand deposit account 601*a* and central bank demand deposit account 601*b* (6G) and electronically transfer those funds (with the interest or a portion of the interest earned in the overnight investment vehicle) into corporate central demand deposit account 606. The amount of interest transferred into corporate central demand deposit account 606 may be determined by a sharing model that the central bank has established with the entity. Similarly, the central bank system may pay the local banks according to a sharing model in exchange for the same-day settlement of the financial transactions.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
    receiving, by a computer processor associated with a relationship banking system, data associated with a financial transaction, wherein the data includes a first routing number corresponding to a first financial institution and a second routing number corresponding to a second financial institution and wherein the first financial institution is different from the second financial institution;
    determining, by the computer processor, that the financial transaction is eligible for same day settlement based on at least one of the first routing number and the second routing number; and
    when the financial transaction is determined to be eligible for same-day settlement, transferring funds associated with the financial transaction into an account associated with an originator of the financial transaction to settle the financial transaction on a same day that the financial transaction is originated,
    wherein the financial transaction is one of a plurality of financial transactions.

2. The computer-implemented method according to claim 1, wherein the account comprises a demand deposit account.

3. The computer-implemented method according to claim 1, wherein the financial transaction comprises a debit transaction.

4. The computer-implemented method according to claim 1, wherein the financial transaction comprises a credit transaction.

5. A computer-implemented method comprising:
    receiving, by a computer processor, information about a plurality of financial transactions, wherein the information includes a first routing number corresponding to a first financial institution and a second routing number corresponding to a second financial institution and wherein the first financial institution is different from the second financial institution;
    determining, by the computer processor, that at least one of the plurality of financial transactions is eligible for same-day settlement based on the received information; and
    transmitting transaction information about the at least one of the plurality of financial transactions that is determined to be eligible for same-day settlement to at least one relationship bank,
    wherein, to settle the at least one of the plurality of financial transactions that is determined to be eligible for same-day settlement, the at least one relationship bank electronically transfers funds associated with the at least one of the plurality of financial transactions into an account associated with an originator of the at least one of the plurality of financial transaction, in accordance with a previously established sharing model.

6. The computer-implemented method according to claim 5, wherein the account comprises a demand deposit account.

7. The computer-implemented method according to claim 5, wherein determining that the at least one of the plurality of financial transactions is eligible for same-day settlement includes:
    determining that the at least one of the plurality of financial transactions is eligible for same-day settlement based on routing or transit numbers associated with the at least one of the plurality of financial transactions.

8. The computer-implemented method according to claim 5, wherein the plurality of financial transactions include debit transactions.

9. The computer-implemented method according to claim 5, wherein the plurality of financial transactions include credit transactions.

10. The computer-implemented method according to claim 5, wherein the determining whether the at least one of the plurality of financial transactions is eligible for same day settlement comprises:
comparing a routing number or a transit number associated with each of the plurality of financial transactions with a routing number or a transit number associated with respective relationship banks.

11. A system comprising:
memory configured to store data and instructions; and
at least one computer processor configured to access the memory and, when executing the instructions, to:
receive information corresponding to a plurality of financial transactions, wherein the information includes a first routing number corresponding to a first financial institution and a second routing number corresponding to a second financial institution and wherein the first financial institution is different from the second financial institution;
determine that at least one of the plurality of financial transactions is eligible for same-day settlement based on the received information; and
transmit transaction information about the at least one of the plurality of financial transactions that is determined to be eligible for same-day settlement to one or more relationship banks,
wherein, to settle the at least one of the plurality of financial transactions that is eligible for same-day settlement, the one or more relationship banks electronically transfers funds associated with the at least one of the plurality of financial transactions into an account associated with an originator of the financial transaction, in accordance with a previously established sharing model.

12. The system according to claim 11,
wherein the account comprises a demand deposit account.

13. The system according to claim 11,
wherein when the computer processor determines that the at least one of the plurality of financial transactions is eligible for same-day settlement, the computer processor is further configured to: determine that the at least one of the plurality of financial transactions is eligible for same-day settlement based on routing or transit numbers associated with the plurality of financial transactions.

14. The system according to claim 11,
wherein the plurality of financial transactions include debit transactions.

15. The system according to claim 11,
wherein the plurality of financial transactions include credit transactions.

16. The system according to claim 11,
wherein when the processor determines that the at least one of the plurality of financial transactions is eligible for same-day settlement, the computer processor is further configured to: compare routing or transit numbers associated with each of the plurality of financial transactions with routing or transit numbers associated with the one or more relationship banks.

17. A computer-implemented method comprising:
receiving, by a computer processor, a plurality of payment instructions, each of the plurality of payment instructions comprising an amount and a routing or transit number associated with an account for redeeming payment;
combining, by the computer processor, the plurality of payment instructions into a financial transaction file; and
transmitting the financial transaction file to a financial settlement processor for same-day settlement,
wherein the financial settlement processor compares the routing or transit numbers associated with each of the plurality of payment instructions in the financial transactions file with routing or transit numbers associated with one or more associated relationship banks to determine whether at least one of the plurality of payment instructions is eligible for same-day settlement, and
wherein, to settle a payment instruction that is determined to be eligible for same-day settlement, an associated relationship bank electronically transfers an amount associated with the payment instruction that is determined to be eligible for same-day settlement into an account associated with the recipient of the payment instruction.

18. The computer-implemented method according to claim 17,
wherein the account comprises a demand deposit account.

19. The computer-implemented method according to claim 17,
wherein the plurality of payment instructions include debit transactions.

20. The computer-implemented method according to claim 17,
wherein the plurality of payment instructions include credit transactions.

21. A system comprising:
memory configured to store data and instructions; and
at least one computer processor configured to access the memory and, when executing the instructions, to:
receive data associated with a financial transaction, wherein the data includes a financial amount,
wherein the data includes a first routing number corresponding to a first financial institution and a second routing number corresponding to a second financial institution and wherein the first financial institution is different from the second financial institution; and
transfer the financial amount into an account associated with an originator of the financial transaction to settle the financial transaction on a same day that the financial transaction is originated based on at least one of the first routing number and the second routing number,
wherein the financial transaction is one of a plurality of financial transactions and the financial transaction is identified as being eligible for same-day settlement using routing or transit numbers associated with an entity that receives the financial transaction, in accordance with a previously established sharing model.

22. A system comprising:
memory configured to store data and instructions; and
at least one computer processor configured to access the memory and, when executing the instructions, to:
receive information about a plurality of financial transactions, wherein the data includes a first routing number corresponding to a first financial institution and a second routing number corresponding to a second financial institution and wherein the first financial institution is different from the second financial institution;
determine that at least one of the plurality of financial transactions is eligible for same-day settlement based on the received information; and
transmit transaction information about the at least one of the plurality of financial transactions that is determined to be eligible for same-day settlement to one or more relationship banks,
wherein, to settle the at least one of the plurality of financial transactions, the one or more relationship banks electronically transfers funds associated with the at least one of the plurality of financial transactions into an account associated with an originator of the at least one of the plurality of financial transactions, in accordance with a previously established sharing model.

23. A system comprising:

memory configured to store data and instructions; and at least one computer processor configured to access the memory and, when executing the instructions, to:

receive a plurality of payment instructions, wherein each of the plurality of payment instructions comprises an amount and at least a first routing number corresponding to a first financial institution and a second routing number corresponding to a second financial institution and wherein the first financial institution is different from the second financial institution;

combine the plurality of payment instructions into a financial transaction file; and transmit the financial transaction file to a financial settlement processor for same day settlement, wherein the financial settlement processor compares, for each of the plurality of payment instructions in the financial transactions file, one or more of at least the first routing number and the second routing number with routing or transit numbers associated with one or more associated relationship banks to determine whether at least one of the plurality of payment instructions is eligible for same-day settlement, and wherein, to settle a payment instruction that is determined to be eligible for same day settlement, an associated relationship bank electronically transfers an amount associated with the respective payment instruction that is determined to be eligible for same-day settlement into an account associated with the recipient of the payment instruction.

24. A computer-implemented method comprising:

receiving, by a computer processor, data associated with a financial transaction, wherein the data includes a financial amount, and wherein the data includes a first routing number corresponding to a first financial institution and a second routing number corresponding to a second financial institution and wherein the first financial institution is different from the second financial institution; and transferring, via the computer processor, the financial amount into an account associated with an originator of the financial transaction to settle the financial transaction on a same day that the financial transaction is originated based on at least one of the first routing number and the second routing number, wherein the financial transaction is one of a plurality of financial transactions and the financial transaction is identified as being eligible for same-day settlement using an indicator associated with the financial transaction.

* * * * *